(12) United States Patent
Hogan et al.

(10) Patent No.: US 9,205,997 B1
(45) Date of Patent: Dec. 8, 2015

(54) ARTICLE TURN CONVEYOR

(71) Applicant: Amazon Technologies, Inc., Reno, NV (US)

(72) Inventors: Michael Roger Hogan, Louisville, KY (US); John Dewayne Prather, Fort Worth, TX (US); Lee Ward Ferguson, Jefersonville, IN (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/102,156

(22) Filed: Dec. 10, 2013

(51) Int. Cl.
*B65G 43/08* (2006.01)
*B65G 47/244* (2006.01)

(52) U.S. Cl.
CPC .................... *B65G 47/244* (2013.01)

(58) Field of Classification Search
CPC .................................................. B65G 74/244
USPC ........................................ 198/374, 401, 416
See application file for complete search history.

(56) References Cited

U.S. PATENT DOCUMENTS

| | | | | |
|---|---|---|---|---|
| 3,332,531 | A * | 7/1967 | Chaney | 198/416 |
| 3,592,328 | A * | 7/1971 | Sapp | 198/374 |
| 3,605,980 | A * | 9/1971 | Donahue et al. | 198/457.03 |
| 3,786,908 | A * | 1/1974 | Jones | 198/416 |
| 4,063,632 | A * | 12/1977 | Neth et al. | 198/374 |
| 4,927,133 | A * | 5/1990 | Evans | 271/225 |
| 4,930,615 | A * | 6/1990 | Nash | 198/411 |
| 5,188,211 | A * | 2/1993 | Ringot et al. | 198/411 |
| 6,935,484 | B2 * | 8/2005 | Davis et al. | 198/416 |
| 7,931,137 | B2 * | 4/2011 | Wargo | 198/416 |
| 2010/0300836 | A1 * | 12/2010 | Fourney et al. | 198/416 |

* cited by examiner

*Primary Examiner* — William R Harp
(74) *Attorney, Agent, or Firm* — Thomas | Horstemeyer, LLP

(57) ABSTRACT

Aspects of a turn conveyor system are described. In one embodiment, the turn conveyor system includes a first conveyor, a second conveyor adjacent to the first conveyor, a lateral conveyor extending between the first conveyor and the second conveyor, and a turn arm. The turn arm may extend across the second conveyor and be coupled to the second conveyor at a position corresponding to an end of the lateral conveyor. In one embodiment, the turn arm includes an extension bar, a rolling bumper having an angular degree of freedom, and an extension down shaft. According to various aspects, the turn conveyor system may displace an article in a first direction with the first conveyor, laterally displace the article in a second direction onto the lateral conveyor, laterally convey the article toward the turn arm, and rotate the article from a first orientation to a second orientation using the turn arm.

20 Claims, 9 Drawing Sheets

ARTICLE TURN CONVEYOR

BACKGROUND

Conveyor systems are relied upon in merchandise, warehouse, and fulfillment center operations for moving articles. In some cases, different articles are moved and directed among several conveyors to various destinations. At the destinations, the articles may be handled manually and, for example, placed onto shelving units or packaged for shipment.

With the ongoing growth in electronic commerce, for example, the size and number of fulfillment centers may continue to grow. In this context, conveyor systems may be relied upon to a greater extent to handle and move various types of articles to several different locations within a fulfillment center. Generally, conveyor systems may be especially useful for transporting large numbers of bulky, heavy, or awkward items. With less overall handling of articles by people, costs may be reduced, efficiencies gained, and, especially for heavy, bulky, or awkward items, injuries avoided.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views. Additionally, certain dimensions or positionings may be exaggerated to help visually convey certain principles.

DETAILED DESCRIPTION

Figure 1:
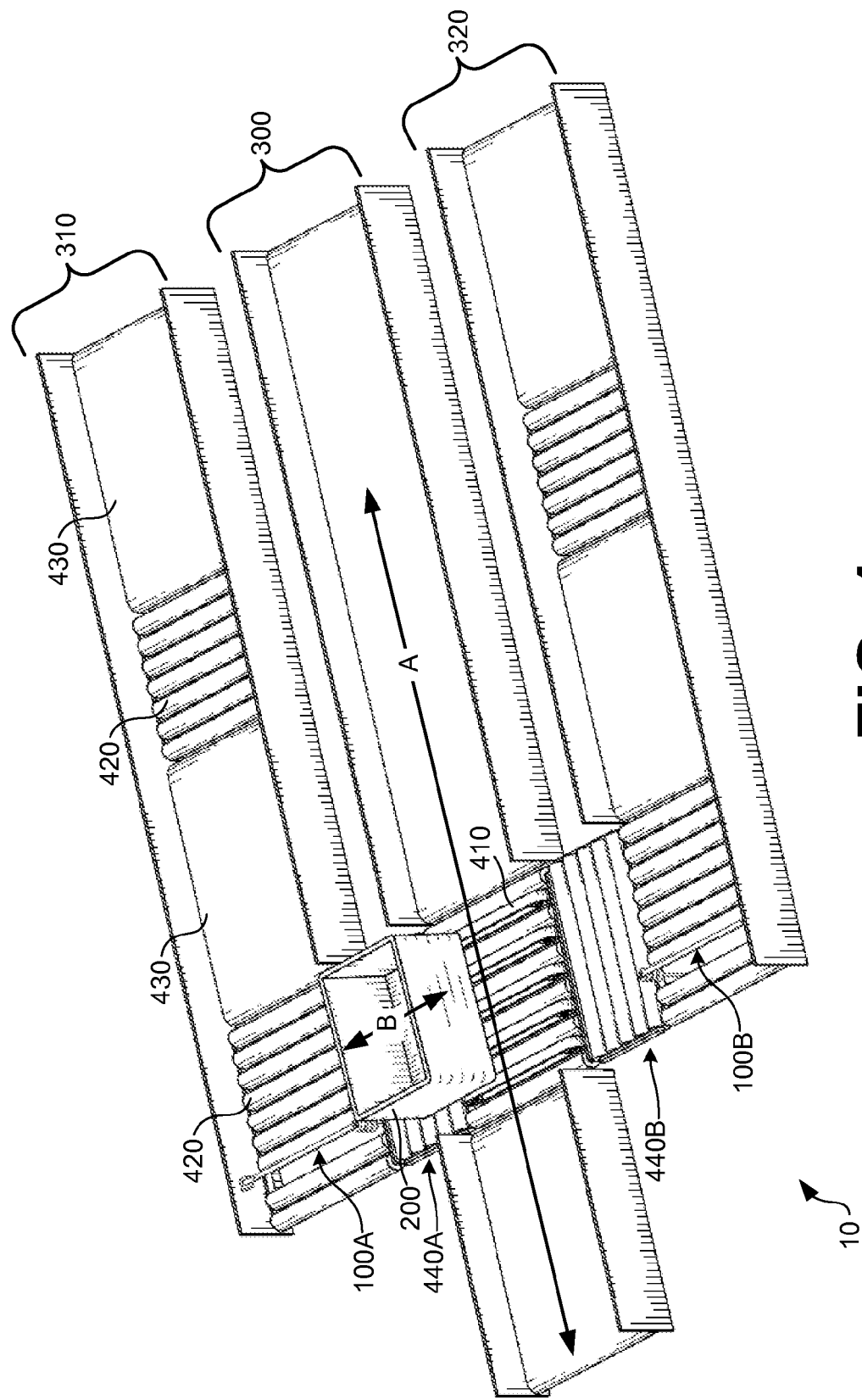
FIG. 1 illustrates a perspective view of a turn conveyor system for conveying and turning an article according to an example embodiment of the present disclosure.

According to features of various turn conveyor systems described herein, an article is rotated as it is displaced along or between one or more conveyors of a conveyor system. In this manner, the orientation of the article may be changed by the conveyor system. The article may be rotated, at least partially, clockwise or counter-clockwise, for example, as it is displaced from one conveyor to another. The rotation of the article may be due to an arm or other mechanical structure which impacts the article as it is being displaced. The impact may cause the article to spin as it is being displaced, until it arrives at a new location with a new orientation. Generally, the new orientation may be beneficial, for example, if it makes the article easier to inspect, grab, hold, etc.

In one case, the turn conveyor system may displace an article in a first direction with a first conveyor. Afterwards, the article may be detected using a sensor and laterally displaced in a second direction. In the second direction, the article may be displaced toward a turn arm and rotated from a first orientation to a second orientation using the turn arm. By rotating the article, it may be easier to handle the article. Especially for repeated manual handling of articles, the proper orientation of articles may prevent stress and injuries.

According to various embodiments described herein, a turn arm used in a conveyor system may extend across a conveyor at a position corresponding to an end of another, lateral conveyor. In one embodiment, the turn arm includes an extension bar, a rolling bumper having an angular degree of freedom, and an extension down shaft.

In the following discussion, a general description of a turn conveyor system is provided, followed by a discussion of the use and operation of the same. Although certain embodiments of the system are discussed in connection with displacement of an article, it should be appreciated that the system is not limited to displacing, turning, or rotating any particular type of article, item, parcel, tote, container, bucket, package, etc. In other words, as used herein, the term article is not intended to be limited to any particular type of article, item, parcel, tote, container, bucket, package, etc. Rather, the embodiments of the turn conveyor system described herein may be relied upon to assist with the movement, displacement, turning, rotating, or re-orienting any movable articles, items, parcels, totes, containers, buckets, packages, etc., without limitation.

As noted above, conveyor systems are useful in merchandise, warehouse, and fulfillment center operations for moving articles. In some cases, different articles are moved and directed among several conveyors to various destinations. At the destinations, the articles may be handled manually and, for example, placed onto shelving units or packaged for shipment. Depending upon the type of article, manual handling may be more or less awkward and/or cumbersome depending upon the orientation of the article. Thus, in certain cases, it may be desirable to change an orientation of an article which rests on or is being moved by a conveyor or conveyor system.

Referring now to the drawings, embodiments of the transport handle are described in further detail.

FIG. 1 illustrates a perspective view of a turn conveyor system 10 for conveying and turning an article 200 according to an example embodiment. The turn conveyor system 10 includes a first conveyor 300, a second conveyor 310, and a third conveyor 320. Each of the first conveyor 300, the second conveyor 310, and the third conveyor 320 extends in a first direction A, as illustrated in FIG. 1. Further, each of the first conveyor 300, the second conveyor 310, and the third conveyor 320 may include one or more roller sections 420, belt sections 430, and/or potentially other sections. One or more of the roller sections 420 and the belt sections 430 may be motorized to displace articles placed on the conveyors 310, 320, and 330. As further described below in connection with FIGS. 7A and 7B, the roller sections 420 and the belt sections 430 may be operated under the control of control logic which operates associated drive motors.

The turn conveyor system 10 further includes a first lateral conveyor 440A and a second lateral conveyor 440B. The lateral conveyors 440A and 440B (collectively "lateral conveyors 440"), as illustrated in the example embodiment of FIG. 1, extend in a second direction substantially orthogonal to the first direction. Here, it is noted that the conveyors 310, 320, and 330 are generally relied upon to displace articles in the first direction, and the lateral conveyors 440 are generally relied upon to displace articles in a second direction which is substantially orthogonal to the first direction. It should be appreciated that the arrangement of the conveyors 310, 320, 330, and 440 is provided by way of example only, as other arrangements of conveyors are within the scope and spirit of the embodiments described herein. Further, it should be appreciated that the arrangement of conveyors need not include conveyors which are arranged substantially orthogonal to each other. Rather, the embodiments described herein may include conveyors arranged in various manners and at various angles relative to each other.

In FIG. 1, an article 200 is illustrated at a position between and upon the first conveyor 300 and the lateral conveyor 440A. As illustrated, the article 200 may include a tote, bucket, or other type of container. According to aspects of the embodiments described herein, the article 200 may be transferred from the first conveyor 300 to the second conveyor 310 by way of the lateral conveyor 440A. Similarly, the article 200 may be transferred from the first conveyor 300 to the third conveyor 320 by way of the lateral conveyor 440B. To provide lateral displacement, the first conveyor 300 includes a lateral displacement mechanism 410. The lateral displacement mechanism 410 may include one or more belts, for example, which extend across the width (i.e., orthogonal to the direction A) of the first conveyor 300, as illustrated in FIG. 1. The plurality of belts of the lateral displacement mechanism 410 may remain retracted between rollers in the first conveyor 300 when not relied upon. When lateral displacement is desired, the plurality of belts are raised, by motorized servos, etc., and rotated (e.g., clockwise or counter-clockwise) to laterally displace the article 200, for example, or other articles. In this manner, it should be appreciated that the article 200 may be displaced from the first conveyor 300 to either the second conveyor 310 or the third conveyor 320. Is should be appreciated that, although the lateral displacement mechanism 410 may be embodied as a plurality of belts, other mechanisms for lateral displacement of articles are within the scope and spirit of the embodiments described herein.

The turn conveyor system 10 further includes a first turn arm 100A and a second turn arm 100B (collectively "turn arms 100"). The first turn arm 100A is coupled to the second conveyor 310, and the second turn arm 100B is coupled to the third conveyor 320. In FIG. 1, the first and second turn arms 110A and 100B are illustrated as being coupled to side rails or bumpers of the second and third conveyors 310 and 320, respectively. Additionally, as further described below, extension down shafts of the turn arms 100 may be coupled or mounted to supporting structures underneath or below the elements of the turn conveyor system 10 illustrated in FIG. 1.

Generally, the turn arms 100A and 100B are positioned proximate to ends of the lateral conveyors 440A and 440B, respectively, as illustrated in FIG. 1. Particularly, the turn arms 100 are positioned such that, when the article 200 is displaced laterally upon one of the lateral conveyors 440, the article 200 will impact a rolling bumper of one of the turn arms 100 and rotate while the article 200 is being displaced laterally between the first conveyor 300 and either the second or third conveyors 310 or 320. In this manner, the article 200 may be rotated from a first orientation to a second orientation as it is laterally displaced from the first conveyor 300 to one of the second or third conveyors 310 or 320. Further aspects of the mechanics of this rotation, based on the structural and mechanical features of the turn conveyor system 10, are further described below.

In various embodiments, the turn conveyor system 10 may be constructed from any materials suitable for the application, such as wood, aluminum, steel, rubber, plastic, or any other natural, synthetic, or composite materials, or combinations thereof, without limitation. The type of materials may be selected based on the application for which the turn conveyor system 10 is designed for use. For example, if the turn conveyor system 10 is designed for transportation of relatively large and/or heavy articles, then the turn conveyor system 10 may be constructed from materials of relative strength. On the other hand, if the turn conveyor system 10 is designed for transportation of relatively small and/or light articles, then the turn conveyor system 10 may be constructed from materials of suitable strength but relatively lighter weight. The elements or parts of the turn conveyor system 10 and the turn arms 100, may be secured together by welds, screws, rivets, adhesives, or any other means or combinations thereof which suitable for the application, without limitation. In general, the turn conveyor system 10 may be assembled in any suitable manners from any suitable materials, based on various applications for use.

Figure 2:
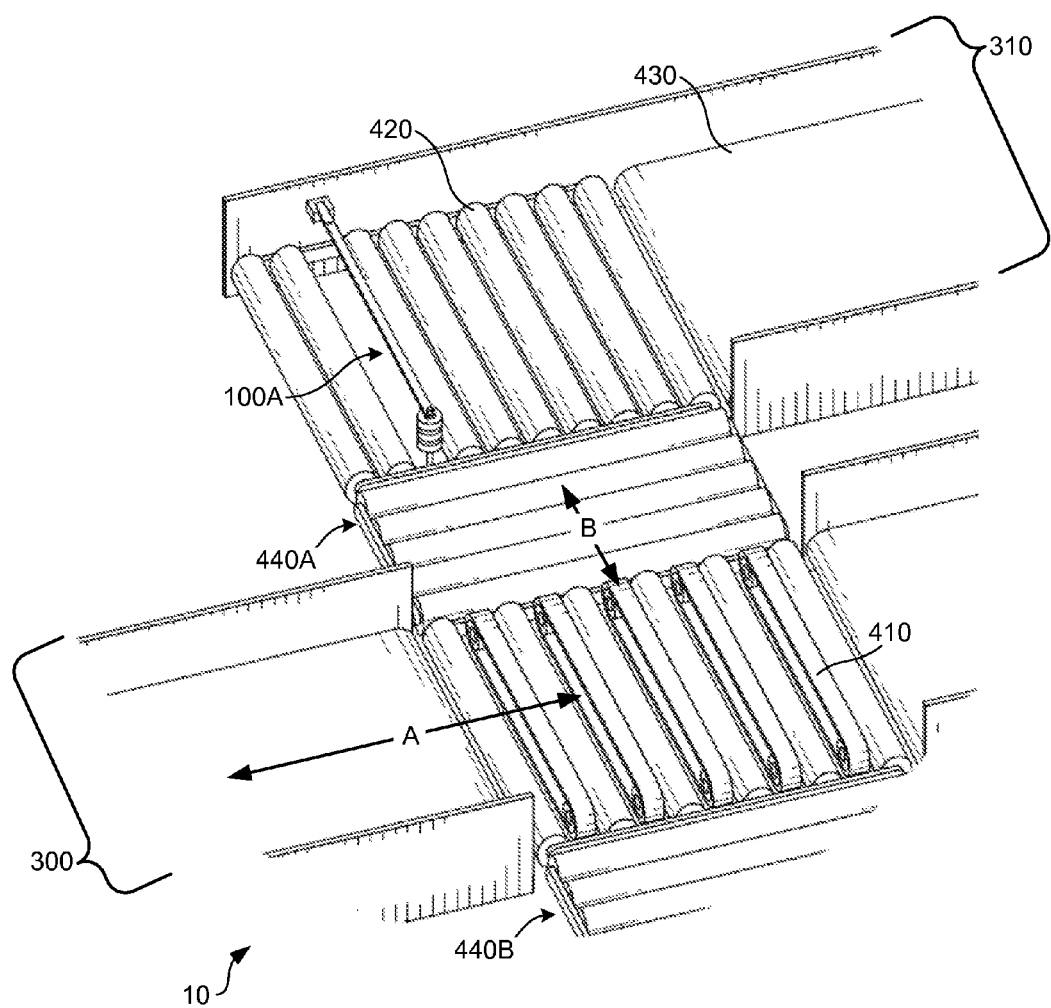
FIG. 2 illustrates another perspective view of certain parts of the turn conveyor system of FIG. 1 according to an example embodiment of the present disclosure.

FIG. 2 illustrates a perspective view of parts of the turn conveyor system 10 of FIG. 1 according to an example embodiment. In FIG. 2, a view of the first conveyor 300, the lateral conveyor 440A, and the second conveyor 310 is provided. In this view, the article 200 is omitted. In this view, the first turn arm 110A and the position of the first turn arm 110A in relation to the lateral conveyor 440A is clearly illustrated. Particularly, one end of the first turn arm 110A is positioned proximate to an end of the lateral conveyor 440A, and another end of the first turn arm 110A is secured to a side rail or bumper of the second conveyor 310. The end of the first turn arm 110A that is proximate to the lateral conveyor 440 includes a bumper with rotating elements, as further described below. As an article is laterally displaced upon the lateral conveyor 440A, the article impacts the bumper of the first turn arm 110A. As described below in connection with FIGS. 5A-5D, this impact causes the article to rotate as it is further displaced onto the second conveyor 310.

Figure 3A:
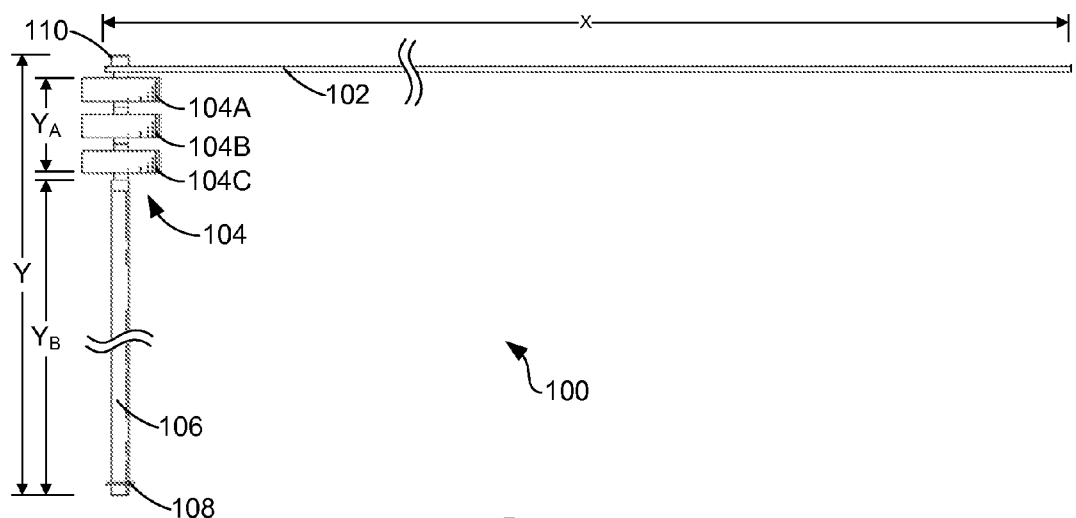
FIG. 3A illustrates a side view of a turn arm of the turn conveyor system of FIG. 1 according to an example embodiment of the present disclosure.

FIG. 3A illustrates a side view of a turn arm 100 of the turn conveyor system 10 of FIG. 1 according to an example embodiment. The turn arm 100 illustrated in FIG. 3A may be representative of either of the turn arms 100A or 100B. The turn arm 100 includes an extension bar 102, a rolling bumper 104, and an extension down shaft 106. The rolling bumper 104 may include a plurality of wheels 104A, 104B, and 104C, each having an angular degree of freedom about an axis of symmetry. In various embodiments, the rolling bumper 104 may include additional or fewer wheels, without limitation. The angular degree of freedom permits each of the wheels to rotate freely about its axis of symmetry, and may be provided based on bearings or any other suitable means to permit freedom of rotational motion. The extension down shaft 106 is coupled to a distal end of the extension bar 102 and extends through a center of the rolling bumper 104 at the axis of symmetry. The extension down shaft 106 further extends through a hole at the distal end of the extension bar 102, as illustrated in FIG. 3A, and may be secured by a screw, bolt, or other type of cap or securing means 110. The extension down shaft 106 may also include a ridge 108 to assist with mounting or seating the turn arm 100.

It should be appreciated that the dimensions X, Y, $Y_A$, and $Y_B$ of the turn arm 100 illustrated in FIG. 3A are provided by way of example only. In practice, the turn arm 100 may be constructed in any size depending upon the application and the dimensions of the conveyor system in which it is used. Generally, the length X of the extension bar 102 may be determined based on a width of a conveyor across which it will be positioned. Similarly, the height Y of the extension down shaft 106 may be determined based on a location at which the rolling bumper 104 should impact an article, or based on relative positions of structures of a conveyor system upon which the turn arm 100 is to be secured.

Figure 3B:
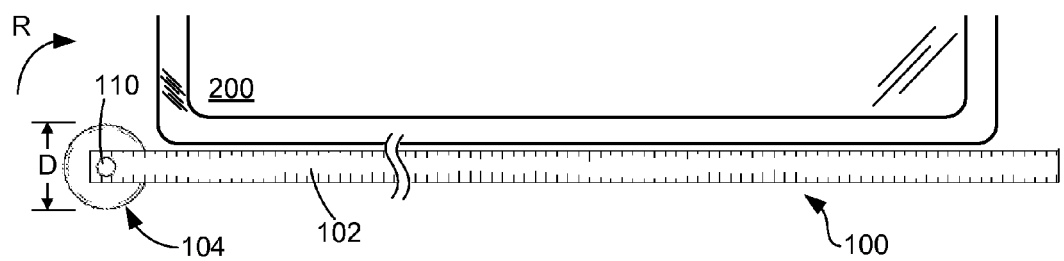
FIG. 3B illustrates a top view of the turn arm of the turn conveyor system of FIG. 1 according to an example embodiment of the present disclosure.

FIG. 3B illustrates a top view of the turn arm 100 of the turn conveyor system 10 of FIG. 1 according to an example embodiment. In FIG. 3B, a diameter D of the rolling bumper 104 is illustrated. The diameter D of the rolling bumper 104, and the diameters of the respective wheels 104A, 104B, and 104C of the rolling bumper 104 may vary among embodiments. As illustrated in FIG. 3B, one function of the extension bar 102 is to prevent the article 200 from continuing to rotate after impacting the rolling bumper 104. Particularly, as the article 200 impacts upon the rolling bumper 104 and continues to displace in a lateral direction, the article 200 will come to rest against the extension bar 102. In this context, the extension bar 102 prevents the article 200 from continuing to rotate in the angular direction R. This rotation is further described below in connection with FIGS. 5A-5D.

Figure 4A:
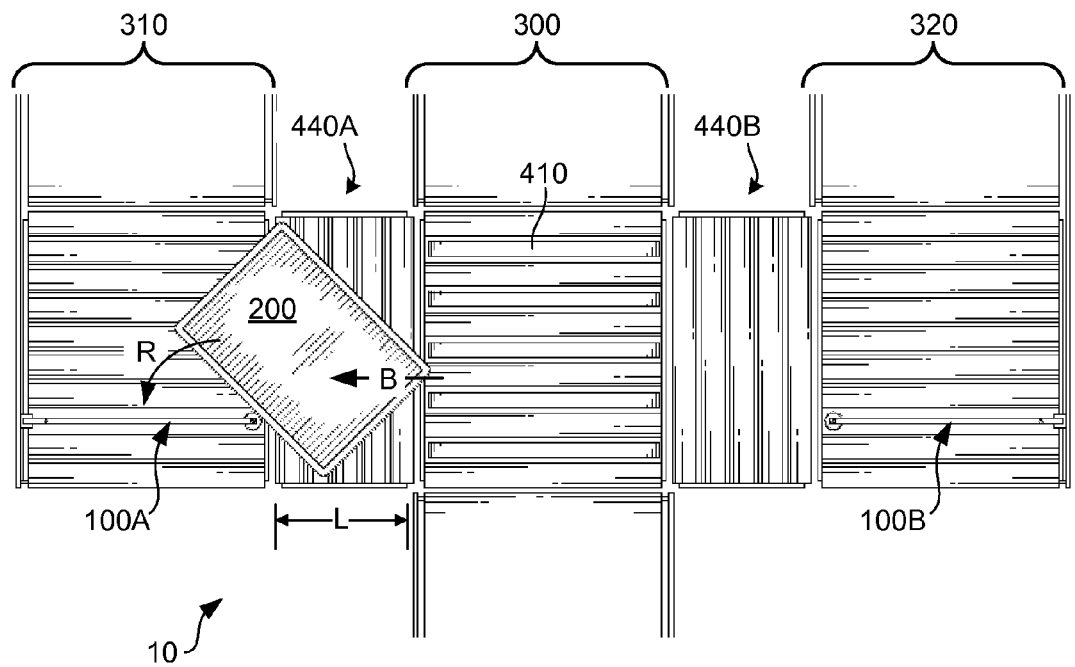
FIG. 4A illustrates a plan view of the turn conveyor system of FIG. 1 according to an example embodiment of the present disclosure.
Figure 4B:
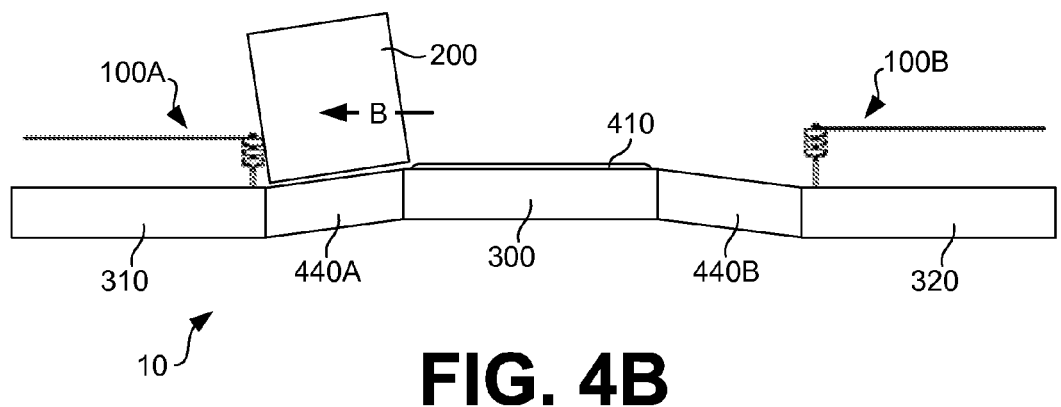
FIG. 4B illustrates a side view of the turn conveyor system of FIG. 1 according to an example embodiment of the present disclosure.

FIG. 4A illustrates a plan view of the turn conveyor system 10 of FIG. 1 according to an example embodiment, and FIG. 4B illustrates a side view of the turn conveyor system 10 of FIG. 1 according to an example embodiment. In FIG. 4A, the article 200 is illustrated as it is displaced laterally in the direction B and after it has impacted the turn arm 100A and has partially rotated in the angular direction R. In this view, the length L of the first lateral conveyor 440A is illustrated. In one embodiment, the length L of the first lateral conveyor 440A is selected in relation to the size of the article 200. Generally, the length L of the first lateral conveyor 440A may be chosen such that, when the lateral displacement mechanism 410 has substantially displaced the article 200 off of the first conveyor 300, the article 200 impacts the turn arm 100A. In other embodiments, the length L of the first lateral conveyor 440A may be selected based upon other considerations.

In FIG. 4B, the relative heights of the first conveyor 300, the second conveyor 310, and the third conveyor 320 are illustrated. Here, it is noted that the first conveyor 300 may be positioned higher than the second or third conveyors 310 or 320. Further, each of the lateral conveyors 440 may slope downward from the first conveyor 300, to either the second or third conveyors 310 or 320. In this manner, as the lateral displacement mechanism 410 displaces the article 200 off of the first conveyor 300 and onto one of the lateral conveyors 440, the weight of the article 200 may cause the article 200 to gain momentum as it slides or rolls downward. The downward slope of the lateral conveyors 440 may help to transition the article 200 off of the plurality of belts of the lateral displacement mechanism 410 and continued to move in the lateral direction B.

Figure 5A:
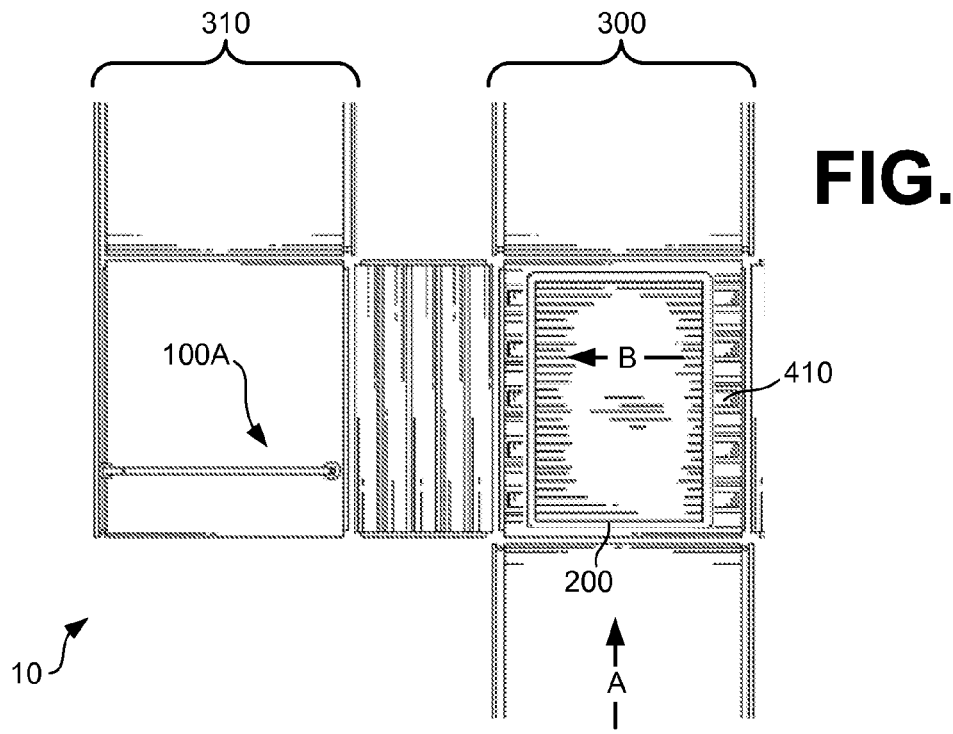
FIG. 5A illustrates a first stage of turning using the turn conveyor system of FIG. 1 according to an example embodiment of the present disclosure.
Figure 5B:
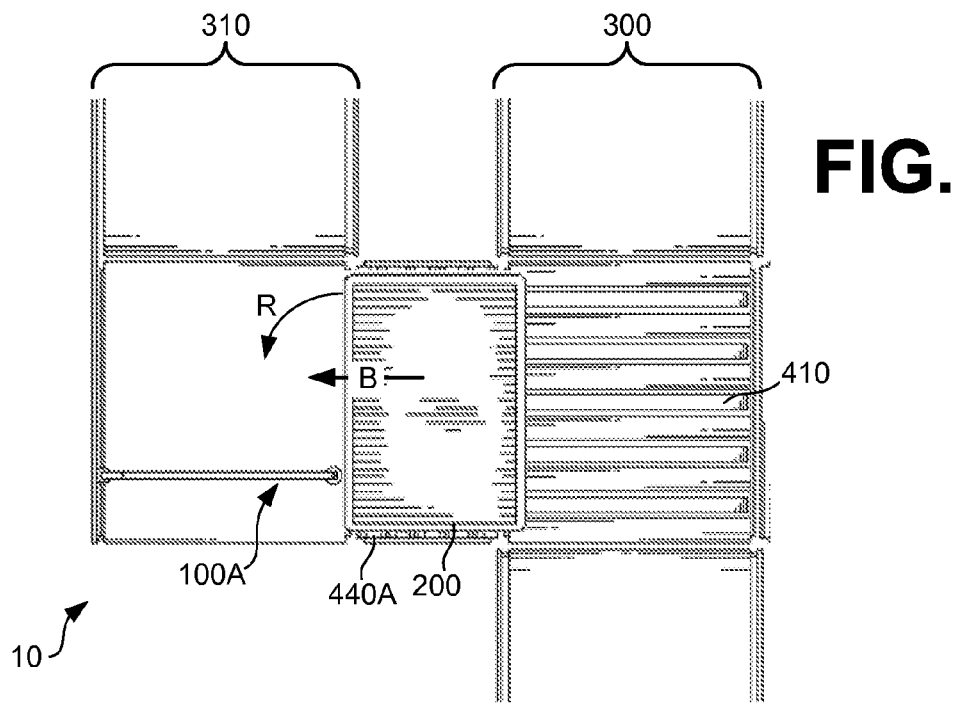
FIG. 5B illustrates a second stage of turning using the turn conveyor system of FIG. 1 according to an example embodiment of the present disclosure.
Figure 5C:
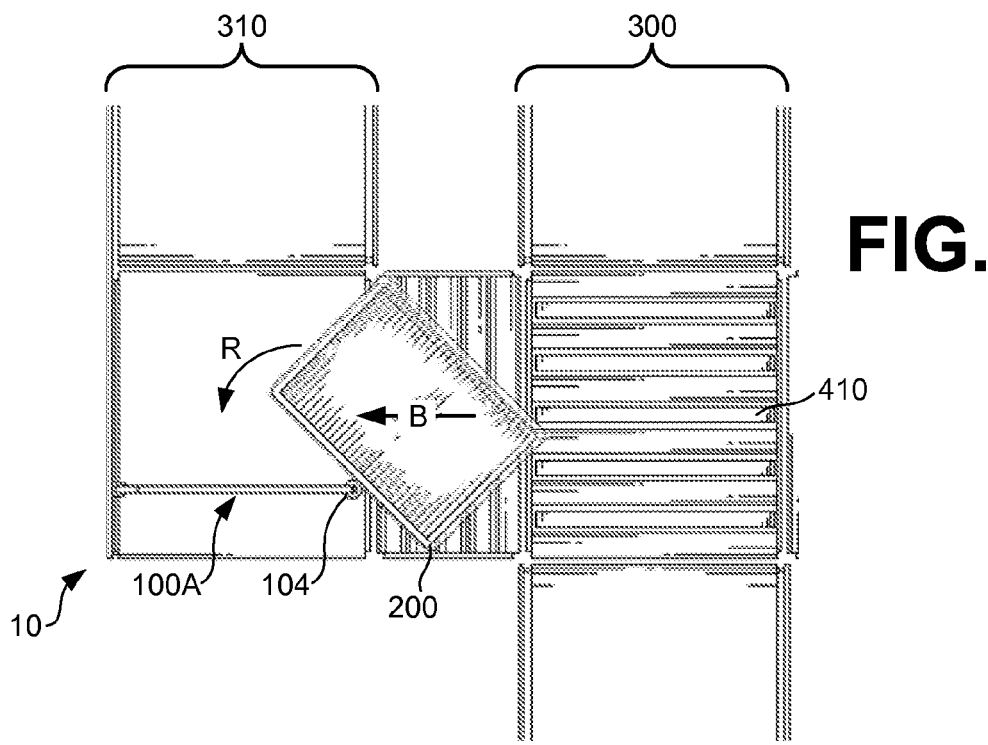
FIG. 5C illustrates a third stage of turning using the turn conveyor system of FIG. 1 according to an example embodiment of the present disclosure.

Turning to FIGS. 5A-5C, various states of turning the article 200 are illustrated. FIG. 5A illustrates a first stage of turning the article 200 using the turn conveyor system 10 of FIG. 1 according to an example embodiment. In FIG. 5A, the article 200 has been displaced on the first conveyor 300 along the direction A. Here, the article 200 has arrived at a position above the lateral displacement mechanism 410 in a first orientation. The position of the article 200 above the lateral displacement mechanism 410 may be detected by various sensors in the turn conveyor system 10, for example, as further described below with reference to FIGS. 7A and 7B. At this point, the article 200 may continue in the direction A or, if it is desired to move the article 200 to the second conveyor 310, the lateral displacement mechanism 410 may be engaged to displace the article 200 in the lateral direction B.

FIG. 5B illustrates a second stage of turning the article 200 using the turn conveyor system 10. In FIG. 5B, the article 200 is illustrated at an initial impact with the turn arm 100A. In this position, the article 200 substantially rests upon the lateral conveyor 440A and has substantially moved off the lateral displacement mechanism 410. Due to the downward slope of the lateral conveyor 440A (and/or other general momentum of the article 200), however, the article 200 does not come to rest upon initial impact with the turn arm 100A. Rather, the article 200 begins to turn in the angular direction R and generally pivots about a rotational axis determined based upon the relative positions of the article 200 and the position of impact of the turn arm 100A against the article 200.

FIG. 5C illustrates a third stage of turning the article 200 using the turn conveyor system 10 of FIG. 1. In FIG. 5C, the article 200 is illustrated at a partially rotated orientation. In this position, the article 200 rests between the lateral conveyor 440A and the second conveyor 310. Due to the downward slope of the lateral conveyor 440A (and/or other general momentum of the article 200), the article 200 has turned in the angular direction R and continues to pivot about the rotational axis determined based upon the position of impact of the turn arm 100A against the article 200. Here, it is noted that the rolling bumper 104 of the turn arm 100A does not impede additional displacement in the direction B and permits the article 200 to continue to rotate in the angular direction R.

Figure 5D:
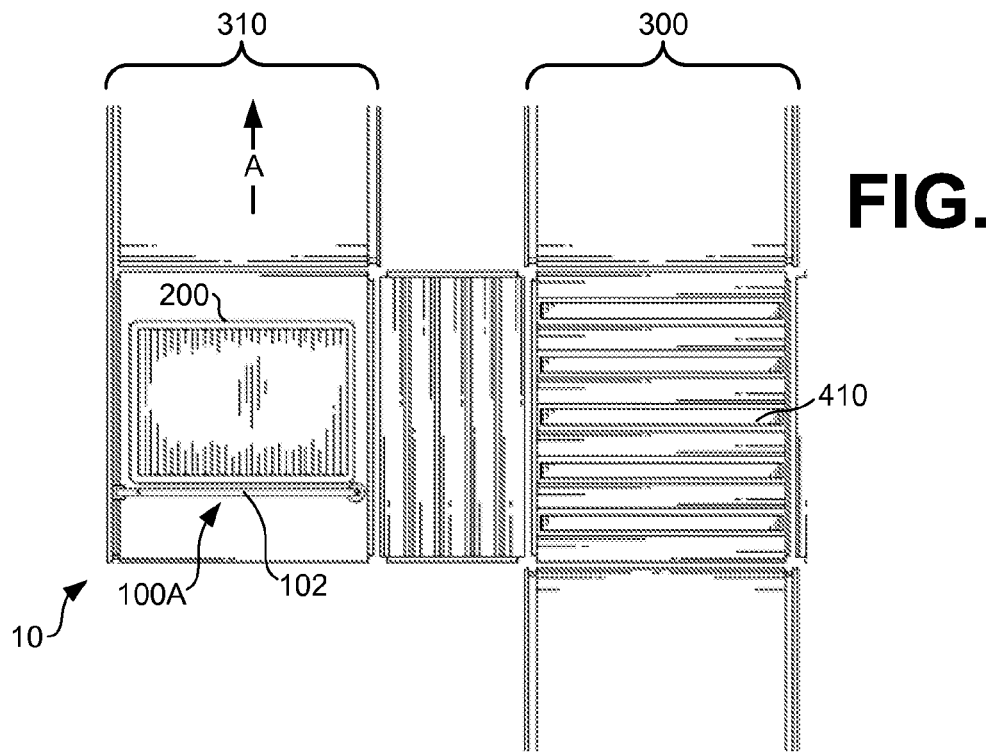
FIG. 5D illustrates a fourth stage of turning using the turn conveyor system of FIG. 1 according to an example embodiment of the present disclosure.

FIG. 5D illustrates a fourth stage of turning the article 200 using the turn conveyor system 10 of FIG. 1. In FIG. 5D, the article 200 is illustrated a position on the second conveyor 310 in a second orientation. As illustrated, it is noted that the article 200 has been rotated approximately 90° in the second orientation (FIG. 5D) as compared to the first orientation (FIG. 5A). It is also noted that, because the article 200 has come into contact with the extension bar 102, the article 200 has not rotated further than approximately 90°. In various embodiments, the turn arm 100A may extend across the second conveyor 310 at an angle with respect to a side or bumper of the second conveyor 310. In this case, it is possible to rotate the article 200 from the first orientation (FIG. 5A) to other orientations, for example, which may be more or less than 90°.

In the position illustrated in FIG. 5D, the article 200 fully rests upon the second conveyor 310, and may be further displaced in the direction A upon the second conveyor 310. As described above, the rotation of the article 200 from the first orientation to the second orientation may assist in a materials handling facility, in connection with handling various items or articles. For example, if the article 200 were embodied as a tote holding several items, it may be more comfortable for an individual to handle the items in the tote when the tote is oriented in the second orientation rather than the first orientation, based on ergonomics.

Figure 6A:
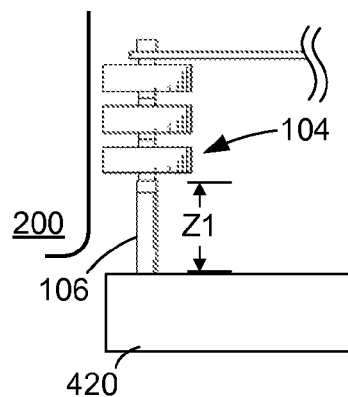
FIG. 6A illustrates a side view of a turn arm of the turn conveyor system of FIG. 1 according to another example embodiment of the present disclosure.
Figure 6B:
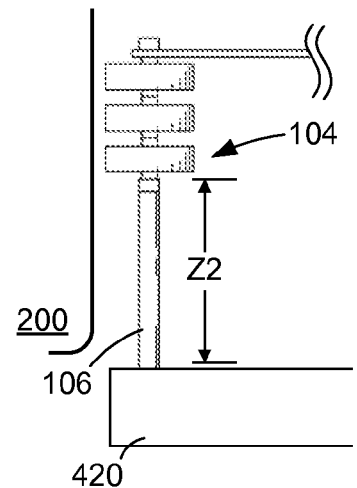
FIG. 6B illustrates a side view of a turn arm according to still another example embodiment of the present disclosure.

With regard to various features and alternative embodiments, FIGS. 6A-6D illustrate certain features and alternative embodiments of turn arms. FIG. 6A illustrates a side view of the turn arm 100 of the turn conveyor system 10 of FIG. 1. In FIG. 6A, the height Z1 between the roller 420 (e.g., of the second conveyor 310) and the rolling bumper 104 is illustrated, along with an example position of the article 200 as it impacts the rolling bumper 104. In this view, it should be appreciated that the position at which the rolling pumper 104 impacts the article 200 may be adjusted based upon the height Z1 between the roller 420 and the rolling bumper 104. For example, as illustrated in FIG. 6B, based on a larger height Z2, the rolling bumper 104 impacts the article 200 at a higher position as compared to FIG. 6A.

Figure 6C:
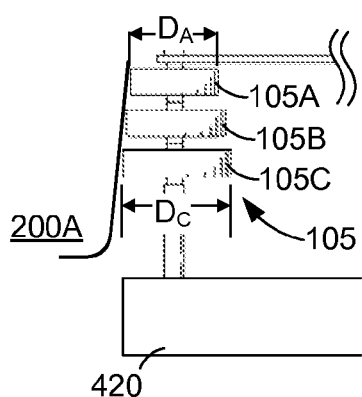
FIG. 6C illustrates a side view of a turn arm according to still another example embodiment of the present disclosure.

FIG. 6C illustrates a side view of a turn arm according to still another example embodiment. In the embodiment of the turn arm illustrated in FIG. 6C, the turn arm includes a graduated rolling bumper 105 which includes a plurality of wheels 105A, 105B, and 105C. The plurality of wheels 105A, 105B, and 105C are graduated in size from a smallest wheel 105A, at a diameter $D_A$, to largest wheel 1050, at a diameter $D_C$ larger than $D_A$. The graduated rolling bumper 105 may be relied upon, for example, for sufficient contact with articles having sloped sides, such as the article 200A. In this case, although the article 200A includes sides having a partial slope, the article 200A may impact the graduated rolling bumper 105 over a sufficiently large area to distribute a force of the impact of the article 200A with the graduated rolling bumper 105 and prevent damage to the article 200A.

Figure 6D:
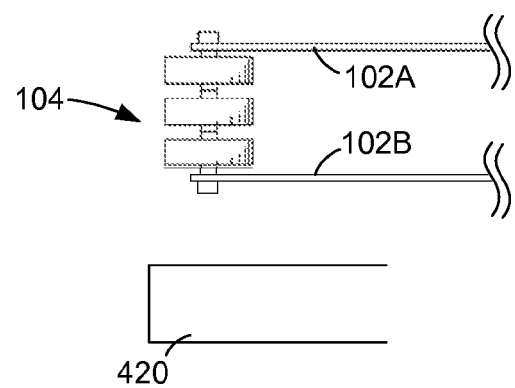
FIG. 6D illustrates a side view of a turn arm according to still another example embodiment of the present disclosure.
Figure 7A:
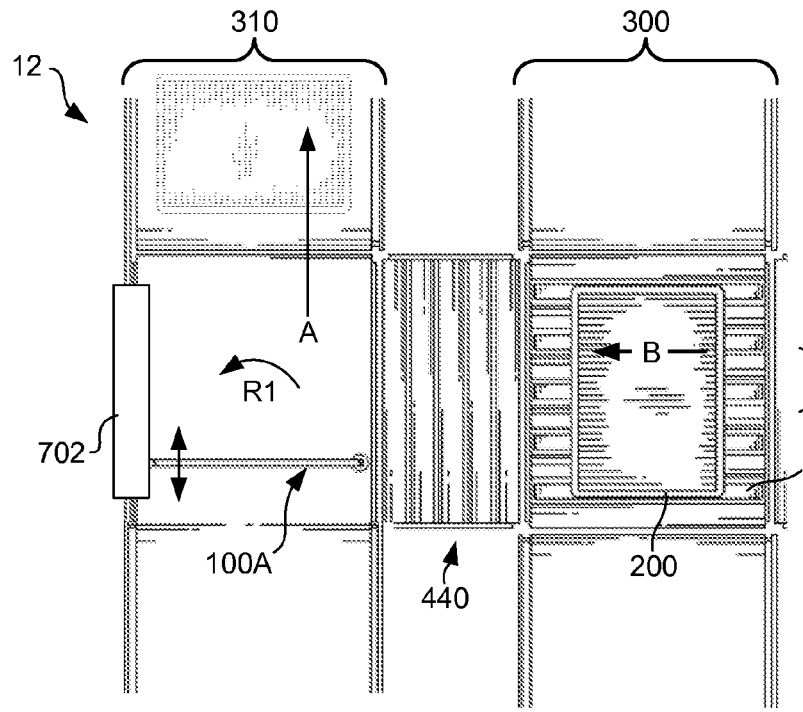
FIG. 7A illustrates a plan view of a turn conveyor system in a first state according to another example embodiment of the present disclosure.

FIG. 6D illustrates a side view of a turn arm according to still another example embodiment. In the embodiment of the turn arm illustrated in FIG. 60, the turn arm includes first and second extension bars 102A and 102B. Here, rather than relying upon an extension down shaft, the rolling bumper 104 is positioned between the first and second extension bars 102A and 102B. Use of the first and second extension bars 102A and 102B may be helpful in cases where the turn arm needs to be repositioned over time, for example, as described below FIG. 7A illustrates a plan view of a turn conveyor system 12 in a first state according to another example embodiment. The turn conveyor system 12 is similar to the turn conveyor system 10 of FIG. 1, but additionally includes one or more sensors 710 that sense a position of the article 200 on the first conveyor 300, an arm positioner 702 that positions the turn arm 100A (and a rolling bumper of the turn arm 100A) at one of a plurality of locations proximate to the end of the lateral conveyor 440, and control logic 720 configured to control an operation of elements of the turn conveyor system 12. Generally, the sensor 710 may include any sensor suitable for the application of identifying and tracking the article 200 as it is displaced or moved over the conveyors in the system 12. In this context, the sensor 710 may include physical, optical, laser, infrared, or any other suitable type of sensor.

The arm positioner 702 may be embodied as any combination of mechanical and/or electrical structures arranged and configured to position the turn arm 100A at a position relative to a conveyor. For example, in FIG. 7A, the arm positioner 702 is configured to position the turn arm 100A at a position over the second conveyor 310 in proximity to an end of the lateral conveyor 440. In this context, the arm positioner 702 may be capable of moving the turn arm 100A in one or more degrees of freedom and in one or more straight or angular directions. The arm positioner 702 may include one or more motors, servos, solenoids, etc. which are directed by control signals received from the control logic 720 to position the turn arm 100A. Generally, the placement of the turn arm 100A by the arm positioner 702 is based upon a desired rotation of an article, such as the article 200, being conveyed in the system 12.

The control logic 720 may be configured to control, among other elements, the arm positioner 702, the first conveyor 300, the lateral displacement mechanism 410, and the second conveyor 310, in concert with each other, to rotate the article 200 while the article 200 is displaced laterally between the first and second conveyors 300 and 310. The control may be based on a supply of power or control signals, for example, to various motors, servos, solenoids, etc. of the elements of the system 12. The control logic 720 may direct the operations of the turn conveyor system 12 based, at least in part, on feedback received from the sensor 710. Additionally, the control logic 720 may be configured to move articles, such as the article 200, to different positions or ends of conveyors in the system 12, over time, as needed.

In the first state of the system 12 illustrated in FIG. 7A, the arm positioner 702 has positioned the turn arm 100A such that the article 200 will be rotated in the first angular direction R1 when it impacts the turn arm 100A. Here, the arm positioner 702 may be operated under control of the control logic 720, when it positions the turn arm 100A. In this case, when the article 200 comes to rest upon the second conveyor 310, the second conveyor 310 may further displace the article 200 in the direction A. Thus, the article 200 may be laterally displaced from the first conveyor 300 to the second conveyor 310, rotated from a first orientation (e.g., lengthwise) to a second orientation (e.g., widthwise) during the lateral displacement, and further displaced in the direction A.

Figure 7B:
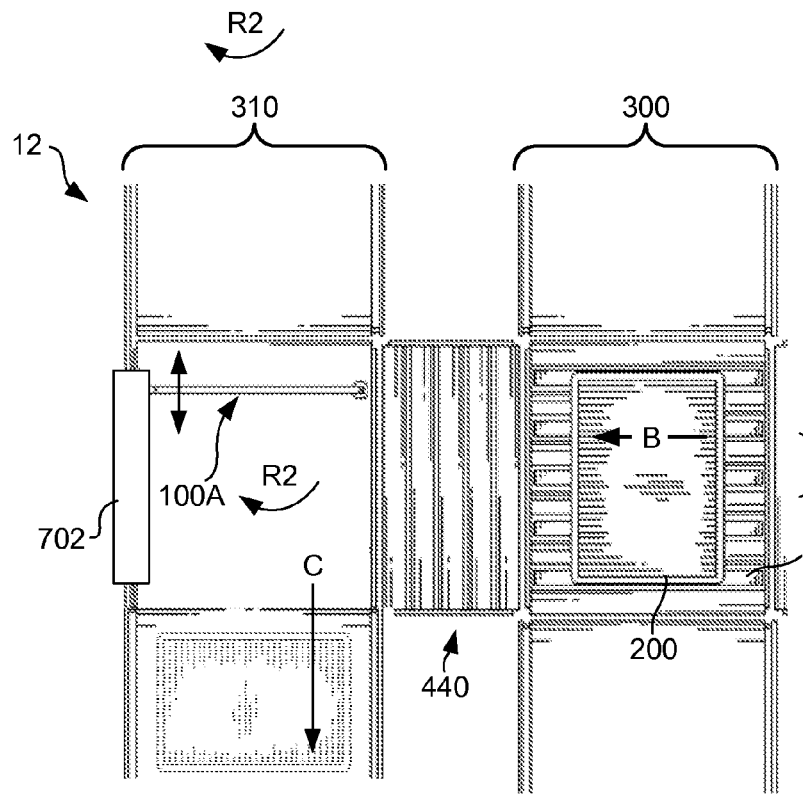
FIG. 7B illustrates a plan view of a turn conveyor system in a second state according to another example embodiment of the present disclosure.

FIG. 7B illustrates a plan view of a turn conveyor system 12 in a second state according to another example embodiment. In the second state of the system 12 illustrated in FIG. 7B, the arm positioner 702 has positioned the turn arm 100A such that the article 200 will be rotated in the second angular direction R2 when it impacts the turn arm 100A. In this case, when the article 200 comes to rest upon the second conveyor 310, the second conveyor 310 may further displace the article 200 in the direction C. Thus, the article 200 may be laterally displaced from the first conveyor 300 to the second conveyor 310, rotated from the first orientation (e.g., lengthwise) to the second orientation (e.g., widthwise) during the lateral displacement, and further displaced in the direction C.

It should be appreciated that, based on a transition from the first state of the system 12 to the second state of the system 12, the article 200 may be rotated in either first or second angular directions, and moved or displaced to various locations. In other embodiments, the control logic 720 may position the turn arm 100A to any suitable position using the arm positioner 702, depending upon the desired operation of the system 12 or, for example, the type of articles being displaced using the system 12. In other words, for articles of differing sizes, shapes, weights, or relative positions, the sensors 710 may determine the sizes, shapes, weights, or relative positions of articles, and the control logic 720 may position the turn arm 100A accordingly for suitable operation of the system 12.

Figure 8:
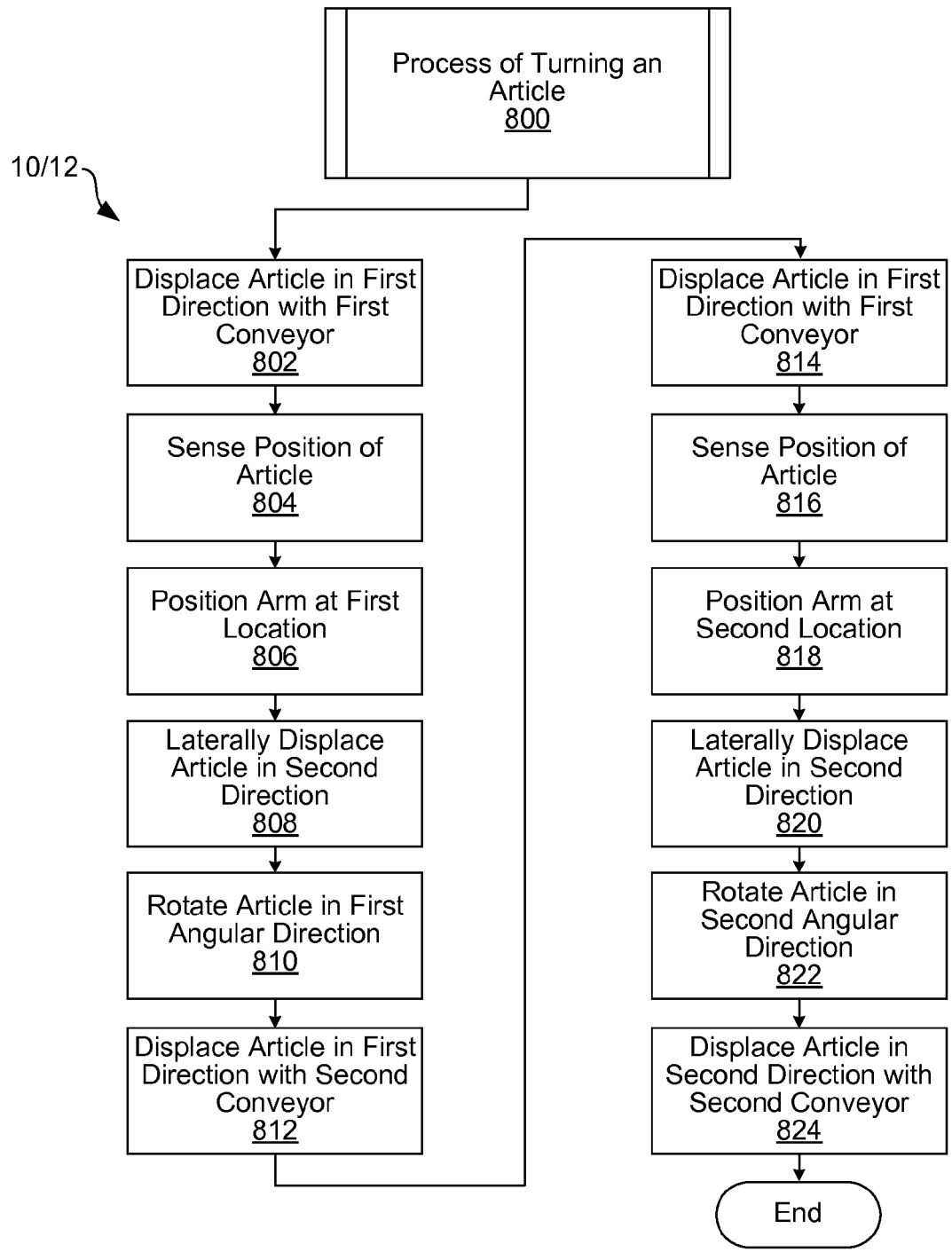
FIG. 8 illustrates a flow diagram of a process for turning an article using the turn conveyor system of FIG. 1, 7A, or 7B according to an example embodiment of the present disclosure.

Referring next to FIG. 8, an example flow diagram of a process 800 for turning an article using the turn conveyor systems 10 or 12 of FIG. 1, 7A, or 7B, for example, is illustrated. It should be appreciated that that the flow diagram of FIG. 8 provides merely one example of various functional arrangements that may be employed to implement the operations of the systems 10 or 12, as described herein. In certain aspects, the flow diagram of FIG. 8 may be viewed as depicting an example group of steps performed by the systems 10 or 12 according to one or more embodiments. It is noted that, while the flow diagram in FIG. 8 is described in connection with the turn conveyor systems 10 or 12 of FIG. 1, 7A, or 7B, the process 800 illustrated in FIG. 8 may be performed by systems other than the systems 10 or 12.

At reference numeral 802, the process 800 includes displacing an article in a first direction with a first conveyor. With reference to FIG. 7A for example context, the conveyor 300 may displace the article 200 in the direction A based on control provided by the control logic 720. At reference numeral 804, the process 800 includes sensing a position of the article on the first conveyor. That is, the sensor 710 may sense a position of the article 200 on the first conveyor 300 at reference numeral 804, using a physical, optical, laser, or any other suitable sensor or sensor means. More particularly, the sensor 710 may sense a position of the article 200 on the first conveyor 300 relative to a location of the lateral conveyor 440. In this manner, for example, the process 800 includes identifying when the article 200 is proximate to the lateral conveyor 440, so that it may be laterally conveyed over the lateral conveyor 440 in the direction A.

At reference numeral 806, the process 800 includes positioning a rolling bumper of a turn arm at a first location proximate to an end of a lateral conveyor. Again, with reference to FIG. 7A for example context, the control logic 720 may control the arm positioner 702 to position the turn arm 100 at a first location proximate to an end of a lateral conveyor 440. In some embodiments, the control logic 720 may position the turn arm 100 based in part on feedback received from the sensor 710. At reference numeral 808, the process 800 includes laterally displacing the article. This may be accomplished for example, by the control logic 720 engaging the lateral displacement mechanism 410 to laterally displace the article 200.

At reference numeral 810, the process 800 includes rotating the article in a first angular direction using the turn arm. For example, in FIG. 7A, the article 200 may be rotated in the first angular direction R1 (e.g., 90° clockwise) according to the position of the turn arm 100 determined at reference numeral 806. As described herein, the rotation in the first angular direction R1 may be due, in part, to various factors, including the momentum of the article 200 provided by the lateral displacement mechanism 410 and/or a downward slope of the lateral conveyor 440 between the first conveyor 300 and the second conveyor 310. At reference numeral 810, the article may be generally rotated from a first orientation on the first conveyor 300 to a second orientation on the second conveyor 310 using the turn arm 100.

At reference numeral 812, the process 800 includes displacing the article in the first direction with the second conveyor. Here, for example, the article 200 may be moved in the first direction A (FIG. 7A) with the second conveyor 310, but in a second orientation as compared to the movement provided by the first conveyor 300. In one embodiment, the process 800 may end after reference numeral 812. Otherwise, the steps 802, 804, 806, 808, 810, and 812 may be repeated. In another embodiment, the process 800 may continue to reference numeral 814 after reference numeral 812.

At reference numeral 814, the process 800 includes displacing an article in a first direction with a first conveyor. This article may be an article different than that which was displaced at reference numeral 802. With reference to FIG. 7B for example context, the conveyor 300 may displace the article 200 (or a similar article) in the direction A based on control provided by the control logic 720. At reference numeral 816, the process 800 includes sensing a position of the article on the first conveyor. That is, the sensor 710 may sense a position of the article 200 on the first conveyor 300 at reference numeral 816, using a physical, optical, laser, or any other suitable sensor or sensor means.

At reference numeral 818, the process 800 includes positioning a rolling bumper of a turn arm at a first location proximate to an end of a lateral conveyor. Again, with reference to FIG. 7B for example context, the control logic 720 may control the arm positioner 702 to position the turn arm 100 at a second location proximate to an end of a lateral conveyor 440. Here, it is noted that the second position may be different than the first position described above for reference numeral 806. The difference in the first and second positions of the turn arm 100 for reference numerals 806 and 818 may account for different locations of impact between the rolling bumper of the turn arm 100 and the article 200, as is illustrated among FIGS. 7A and 7B. Due to this difference, the article 200 may rotate in a different direction at reference numeral 822 than at reference numeral 810, as described below.

At reference numeral 820, the process 800 includes laterally displacing the article. This may be accomplished for example, by the control logic 720 engaging the lateral displacement mechanism 410 to laterally displace the article 200. At reference numeral 822, the process 800 includes rotating the article in a second angular direction using the turn arm. For example, in FIG. 7B, the article 200 may be rotated in the second angular direction R2 (e.g., 90° counter-clockwise) according to the position of the turn arm 100 determined at reference numeral 818. As described herein, the rotation in the second angular direction R2 may be due, in part, to various factors, including the momentum of the article 200 provided by the lateral displacement mechanism 410 and/or a downward slope of the lateral conveyor 440 between the first conveyor 300 and the second conveyor 310. At reference numeral 822, the article may be generally rotated from a first orientation on the first conveyor 300 to a second orientation on the second conveyor 310 using the turn arm 100.

At reference numeral 824, the process 800 includes displacing the article in a second direction with the second conveyor. Here, for example, the article 200 may be moved in the second direction B (FIG. 7B) with the second conveyor 310, but in a second orientation as compared to the movement provided by the first conveyor 300. In one embodiment, the process 800 may end after reference numeral 824. Otherwise, the steps 814, 816, 818, 820, 822, and 824 may be repeated. In still another embodiment, the process 800 may continue proceed back to reference numeral 802.

As described above, the process 800 may be directed, at least in part, based on the direction of the control logic 720 in FIGS. 7A and 7B. In this context, it is noted that the control logic 720 may include one or more computing circuits and/or devices. Each computing circuit or device may include a processor and a memory, both of which may be electrically and communicatively coupled to communications interfaces. The memory or memories relied upon by the control logic 720 may store data and software or executable-code components executable by processing circuits. For example, the memory or memories may store executable-code components associated with the process 800 of FIG. A.

The terms "executable" or "for execution," as described above, refer to software forms that can ultimately be run or executed by processing circuits of the control logic 720, whether in source, object, machine, or other form. Examples of executable programs include, for example, a compiled program that can be translated into a machine code format and loaded into a random access portion of a memory and executed by processing circuits of the control logic 720, source code that can be expressed in an object code format and loaded into a memory and executed by processing circuits of the control logic 720, or source code that can be interpreted by another executable program to generate instructions in a memory and executed by processing circuits of the control logic 720, etc.

An executable program may be stored in any portion or component of a memory of the control logic 720 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component.

In various embodiments, a memory of the control logic 720 may include both volatile and nonvolatile memory and data storage components. Volatile components are those that do not retain data values upon loss of power. Nonvolatile components are those that retain data upon a loss of power. Thus, a memory of the control logic 720 may include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM may include, for example, a static random access memory (SRAM), dynamic random access memory (DRAM), or magnetic random access memory (MRAM), and/or other similar memory device. The ROM may include, for example, a programmable read-only memory (PROM), erasable programmable read-only memory (EPROM), electrically erasable programmable read-only memory (EEPROM), or other similar memory device.

In other embodiments, the control logic 720 may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flow diagram or process diagram of FIG. 8 is representative of certain processes, functionality, and operations of embodiments discussed herein. Each block may represent one or a combination of steps in a process performed by various elements in a conveyor system, including mechanical and/or electrical elements. Although the flow diagram or process diagram of FIG. 8. illustrates a specific order, it is understood that the order may differ from that which is depicted. For example, an order of two or more blocks may be scrambled relative to the order shown. Also, two or more blocks shown in succession in FIG. 8 may be performed concurrently or with partial concurrence. Further, in some embodiments, one or more of the blocks shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the control logic 720 that are embodied, at least in part, by software or executable-code components, may be embodied or stored in any tangible or non-transitory computer-readable medium or device for execution by an instruction execution system such as a general purpose processor. In this sense, the logic may be embodied as, for example, software or executable-code components that can be fetched from the computer-readable medium and executed by the instruction execution system. Thus, the instruction execution system may be directed by execution of the instructions to perform certain processes such as those illustrated in FIG. 8. In the context of the present disclosure, a "computer-readable medium" can be any tangible medium that can contain, store, or maintain any logic, application, software, or executable-code component described herein for use by or in connection with an instruction execution system.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. A turn conveyor system, comprising:
    a first conveyor extending in a first direction that displaces, in the first direction, an article positioned in a first orientation, the first conveyor comprising a lateral displacement mechanism configured to displace the article laterally in a second direction substantially orthogonal to the first direction;
    a second conveyor extending substantially in the first direction and positioned adjacent to the first conveyor;
    a lateral conveyor extending between the first conveyor and the second conveyor in the second direction; and
    a turn arm coupled to the second conveyor at a position corresponding to an end of the lateral conveyor that extends across at least a portion of the second conveyor, the turn arm comprising:
        an extension bar;
        a rolling bumper comprising a plurality of wheels each having an angular degree of freedom about an axis of symmetry; and
        an extension down shaft coupled to a distal end of the extension bar that extends through a center of each of the plurality of wheels of the rolling bumper at the axis of symmetry, wherein:

the lateral displacement mechanism displaces the article in the second direction, onto the lateral conveyor, and toward the turn arm; and when the article reaches the turn arm, the turn arm causes the article to rotate from the first orientation to a second orientation while the article is displaced laterally in the second direction and positioned onto the second conveyor.

2. The system according to claim 1, wherein the plurality of wheels are graduated in size from smallest to largest along the extension down shaft for contact with articles having sloped sides.

3. A method of turning an article, comprising:
displacing the article in a first direction with a conveyor;
sensing a position of the article on the conveyor;
positioning a rolling bumper of a turn arm at a first location proximate to an end of a lateral conveyor;
laterally displacing the article in a second direction onto the lateral conveyor;
laterally conveying the article toward the turn arm; and
rotating the article from a first orientation to a second orientation using the turn arm.

4. The method according to claim 3, further comprising, after the rotating, displacing the article in the first direction with a second conveyor.

5. The method according to claim 4, wherein a height of the conveyor is greater than a height of the second conveyor.

6. The method according to claim 3, further comprising, by laterally displacing the article, rotating the article in a first angular direction by contact with the turn arm.

7. The method according to claim 3, wherein:
sensing the position of the article comprises sensing the position of the article on the conveyor relative to a location of the lateral conveyor, using a physical, optical, or laser sensor; and
positioning the rolling bumper of the turn arm comprises positioning the rolling bumper at the first location proximate to the end of the lateral conveyor for rotating the article in a first angular direction when the article is laterally displaced into contact with the turn arm.

8. The method according to claim 7, further comprising displacing, in the second orientation, the article in the first direction with a second conveyor.

9. The method according to claim 8, further comprising:
sensing a position of a second article on the conveyor relative to the location of the lateral conveyor; and
positioning the rolling bumper of the turn arm at a second location proximate to the end of the lateral conveyor for rotating the second article in a second angular direction when the second article is laterally displaced into contact with the turn arm.

10. The method according to claim 9, further comprising, by laterally displacing the second article, rotating the second article in the second angular direction using the turn arm.

11. The method according to claim 10, further comprising displacing the second article in a third direction with the second conveyor.

12. The method according to claim 3, wherein the turn arm comprises:
an extension bar; and
the rolling bumper having an angular degree of freedom about an axis of symmetry.

13. A turn conveyor system, comprising:
a first conveyor and a second conveyor extending adjacent to each other, the first conveyor comprising a lateral displacement mechanism configured to displace an article laterally between the first conveyor and the second conveyor;
a lateral conveyor extending between the first conveyor and the second conveyor; and
a turn arm coupled to the second conveyor, the turn arm comprising:
an extension bar;
a rolling bumper comprising a plurality of wheels each having an angular degree of freedom about an axis of symmetry; and
an extension down shaft coupled to a distal end of the extension bar that extends through a center of each of the plurality of wheels of the rolling bumper at the axis of symmetry, wherein:
the lateral displacement mechanism displaces the article laterally onto the lateral conveyor and toward the second conveyor and the turn arm; and
when the article reaches the turn arm, the turn arm causes the article to rotate from a first orientation to a second orientation while the article is displaced laterally and positioned onto the second conveyor.

14. The system according to claim 13, wherein the plurality of wheels are graduated in size from smallest to largest along the extension down shaft for contact with articles having sloped sides.

15. The system according to claim 13, wherein:
the first conveyor displaces, in a first direction, the article positioned in the first orientation; and
the lateral displacement mechanism displaces the article laterally in a second direction orthogonal to the first direction, onto the lateral conveyor, and toward the turn arm.

16. The system according to claim 15, wherein, when the article reaches the turn arm, the turn arm causes the article to rotate in a first angular direction from the first orientation to the second orientation while the article is displaced laterally in the second direction and positioned onto the second conveyor.

17. The system according to claim 16, wherein, after the article is positioned onto the second conveyor in the second orientation, the second conveyor displaces, in the first direction, the article positioned in the second orientation.

18. The system according to claim 15, wherein, when the article reaches the turn arm, the turn arm causes the article to rotate in a second angular direction from the first orientation to the second orientation while the article is displaced laterally in the second direction and positioned onto the second conveyor.

19. The system according to claim 18, wherein, after the article is positioned onto the second conveyor in the second orientation, the second conveyor displaces, in a third direction, the article positioned in the second orientation.

20. The system according to claim 13, further comprising:
a sensor that senses a position of the article on the first conveyor relative to a location of the lateral conveyor;
an arm positioner that positions the rolling bumper of the turn arm to one of a plurality of locations; and
control logic configured to control an operation of the arm positioner and the first conveyor to rotate the article while the article is displaced laterally between the first and second conveyors.

* * * * *